United States Patent
Gooding et al.

(10) Patent No.: US 8,438,571 B2
(45) Date of Patent: May 7, 2013

(54) THREAD SPECULATIVE EXECUTION AND ASYNCHRONOUS CONFLICT

(75) Inventors: Thomas M. Gooding, Rochester, MN (US); John Kevin O'Brien, South Salem, NY (US); Kai-Ting Amy Wang, Ontario (CA); Xiaotong Zhuang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 12/711,328

(22) Filed: Feb. 24, 2010

(65) Prior Publication Data

US 2011/0209154 A1 Aug. 25, 2011

(51) Int. Cl.
*G06F 9/46* (2006.01)
(52) U.S. Cl.
USPC ............................ 718/102; 718/107; 712/228
(58) Field of Classification Search .................. None
See application file for complete search history.

(56) References Cited

U.S. PATENT DOCUMENTS

| 2009/0177871 | A1* | 7/2009 | Von Praun et al. | 712/226 |
| 2010/0262812 | A1* | 10/2010 | Lopez et al. | 712/228 |
| 2010/0269102 | A1* | 10/2010 | Latorre et al. | 717/130 |
| 2010/0299509 | A1* | 11/2010 | Doi et al. | 712/241 |
| 2011/0119525 | A1* | 5/2011 | Muralimanohar et al. | 714/15 |

OTHER PUBLICATIONS

IBM Patent Application, U.S. Appl. No. 12/711,352, entitled "Speculative Thread Execution with Hardware Transactional Memory," filed Feb. 24, 2010 by Mark E. Giampapa et al.
Tom Knight, "An Architecture for Mostly Functional Languages," 1986, pp. 105-112, ACM.
Manoj Franklin et al., "ARB: A Hardware Mechanism for Dynamic Reordering of Memory References," pp. 1-28.
Marcelo Cintra et al., "Architectural Support for Scalable Speculative Parallelization in Shared-Memory Multiprocessors," Intl. Symp. on Computer Architecture (ISCA), Jun. 2000, pp. 13-24.
J. Gregory Steffan et al., "A Scalable Approach to Thread-Level Speculation," pp. 1-12.
Pedro Marcuello et al., "Clustered Speculative Multithreaded Processors," pp. 1-23.
Lance Hammond et al., "Data Speculation Support for a Chip Multiprocessor," pp. 1-12.
Jeffrey Oplinger et al., "In Search of Speculative Thread-Level Parallelism," Stanford University, pp. 1-41.

(Continued)

*Primary Examiner* — Emerson Puente
*Assistant Examiner* — Dong Kim
(74) *Attorney, Agent, or Firm* — Matthew C. Zehrer

(57) ABSTRACT

In an embodiment, asynchronous conflict events are received during a previous rollback period. Each of the asynchronous conflict events represent conflicts encountered by speculative execution of a first plurality of work units and may be received out-of-order. During a current rollback period, a first work unit is determined whose speculative execution raised one of the asynchronous conflict events, and the first work unit is older than all other of the first plurality of work units. A second plurality of work units are determined, whose ages are equal to or older than the first work unit, wherein each of the second plurality of work units are assigned to respective executing threads. Rollbacks of the second plurality of work units are performed. After the rollbacks of the second plurality of work units are performed, speculative executions of the second plurality of work units are initiated in age order, from oldest to youngest.

7 Claims, 10 Drawing Sheets

OTHER PUBLICATIONS

Sridhar Gopal et al., "Speculative Versioning Cache," to appear in the Fourth International Symposium on High-Performance Computer Architecture, pp. 1-11.

Manish Gupta et al., "Techniques for Speculative Run-Time Parallelization of Loops," pp. 1-12.

V. Krishnan et al., "The Need for Fast Communication in Hardware-Based Speculative Chipmultprocessors," Parallel Architectures and Compilation Techniques, 1999 Proceedings, 1999 International Conference on, Abstract.

Jenn-Yuan Tsai et al., "The Superthreaded Processor Architecture," pp. 0-40.

Ye Zhang et al., "DSM Hardware for Speculative Parallelization." pp. 1-5.

Walther Maldonado et al, Scheduling Support for Transactional Memory Contention Management, Jan. 9-14, 2010, pp. 1-11, ACM, Bangalore, India.

Ravi Rajwar et al., Transactional Lock-Free Execution of Lock-Based Programs, Oct. 6-9, 2002, pp. 1-13, ACM, San Jose, USA.

* cited by examiner

THREAD SPECULATIVE EXECUTION AND ASYNCHRONOUS CONFLICT

FIELD

An embodiment of the invention generally relates to thread-level speculative processor execution and more particularly to initiating work unit rollbacks in a current time period in response to asynchronous conflict events that were received in a previous time period.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. Currently, many computer designers opt to use the increasing transistor budget to build ever bigger and more complex uni-processors. Alternatively, multiple processor cores can be placed on a single chip, which is often called chip multiprocessor (CMP) design.

Placing multiple smaller processor cores on a single chip is attractive because a single, simple processor core is less complex to design and verify. This results in a less costly and complex verification process, as a once verified module, the processor, is repeated multiple times on a chip. A way to take advantage of the multi-processors is to partition sequential computer programs into threads and execute them concurrently and speculatively, on the multiple processors. Concurrent thread execution means that different threads of a given program can execute on any available processor, and different threads of the given program can execute on different processors at the same time. Thus, a speculative multi-threaded processor consists logically of replicated processor cores that cooperatively perform the parallel execution of a sequential program.

Speculative thread execution means that the threads are allowed to optimistically assume that shared data structures can be written without conflict with the concurrent reads and writes of other speculative threads. The speculative writes to the shared data structures that are requested by a threads are kept pending (meaning that the updated data written by one thread is not visible to or accessible by other threads) until the system confirms that no conflicts with accesses to the shared data structures by other threads have occurred. If conflicts between the storage accesses of other threads are detected, the system discards the pending speculative writes, rolls back the thread, and re-executes the thread. If no conflicts are detected, the system commits the pending speculative writes to memory where the shared data structures become visible to and accessible by other threads.

Conflicts between threads are reported by the hardware to the operating system in the form of interrupts. These interrupts are asynchronous and can arrive at the operating system out-of-order from the order in which the hardware sent them, due to factors such as on-chip wire delay and asymmetric distance from the processor cores to the memory.

SUMMARY

A method, computer-readable storage medium, and computer system are provided. In an embodiment, asynchronous conflict events are received during a previous rollback period. Each of the asynchronous conflict events represent conflicts encountered by speculative execution of a first plurality of work units and may be received out-of-order. During a current rollback period, a first work unit is determined whose speculative execution raised one of the asynchronous conflict events, and the first work unit is older than all other of the first plurality of work units. A second plurality of work units are determined, whose ages are equal to or older than the first work unit, wherein each of the second plurality of work units are assigned to respective executing threads. Rollbacks of the second plurality of work units are performed. After the rollbacks of the second plurality of work units are performed, speculative executions of the second plurality of work units are initiated in age order, from oldest to youngest. The work units are committed in age order.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
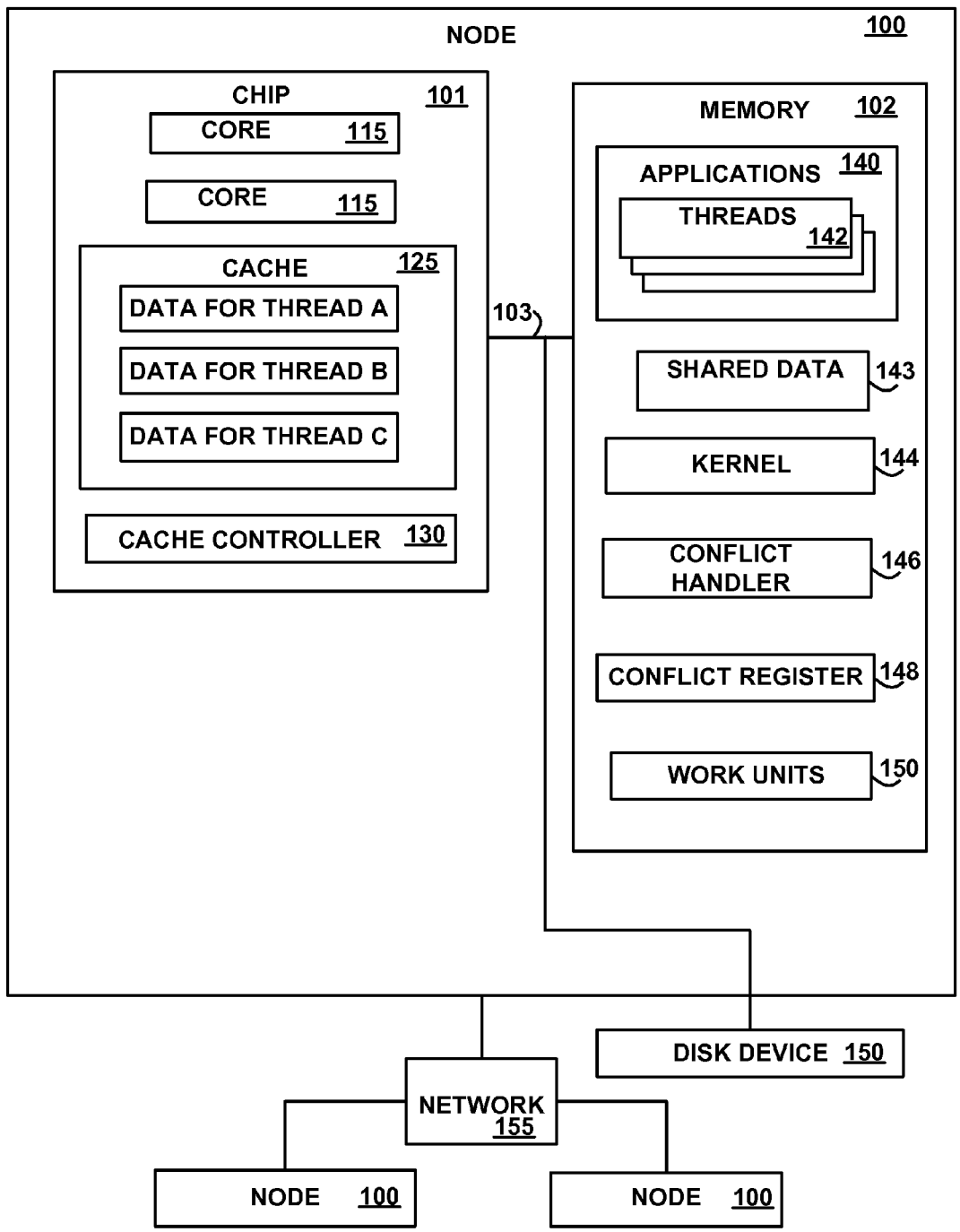
FIG. 1 depicts a high-level block diagram of an example system for implementing an embodiment of the invention.

Referring to the Drawings, wherein like numbers denote like parts throughout the several views, FIG. 1 depicts a high-level block diagram representation of node computer systems 100 connected via a network 155. In an embodiment, one or more of the node computer systems 100 are also connected to disk devices 150 or other secondary storage.

The major components of the nodes 100 comprise a chip 101 and a main memory 102, which are communicatively coupled, directly or indirectly, for inter-component communication via a bus 103. Although FIG. 1 only illustrates one chip 101, in other embodiments any number of chips may be present.

The chip 101 comprises any number of cores 115, a shared cache 125, and a cache controller 130. Each core 115 comprises a processor that is a general-purpose programmable central processing unit (CPUs) and may also include cache. Each processor executes instructions stored in the main memory 102.

The cache controller 130 controls access to the shared cache 125, detects conflicts between threads 142, and raises asynchronous interrupts that represent the conflicts to the kernel 144. The asynchronous interrupts may arrive at the kernel 144 out-of-order from the order of their detection by the cache controller 130.

The cache 125 stores data that speculatively-executed threads access (read and/or write) prior to the data being committed and written to the memory 102. In response to threads requesting an access (read or write) of data from or to the memory 102, the core adds the read or written data into the cache 125 until the transaction is committed. A thread is able to read its own data from the cache 125, but is not allowed to read the data from the cache 125 that has been written to or read from the cache 125 by other threads. In various embodiments the cache 125 may be a L2 (Level 2) cache, but in other embodiments any appropriate level or type of cache may be used.

A processor cache is memory used by a processor to reduce the average time needed to access data. Caches are typically smaller and faster than the main memory 102 and store copies of the data from main memory locations. In a multi-level cache system, a processor has multiple caches, with small fast caches backed up by larger slower caches. When the processor needs to read from or write to a location in the main memory 102, the processor first checks whether a copy of that data is in the L1 (Level 1) cache. If so, the processor reads from or writes to the L1 cache, which is faster than reading from or writing to the main memory 102. If the desired data is not present in the L1 cache, the processor checks the next larger cache (the L2 cache) for the data, and so on, until no more caches exist, which causes the processor to access the main memory 102 for the data.

The main memory 102 is a random-access semiconductor memory, storage device, or storage medium for storing or encoding data and programs. The main memory 102 is conceptually a single monolithic entity, but in other embodiments the main memory 102 is a more complex arrangement, such as a hierarchy of caches and/or other memory devices. For example, the memory 102 may exist in multiple levels of memory devices of varying sizes and speeds. The memory 102 is shared by the cores 115 in the chip 101.

The main memory 102 stores or encodes applications 140, shared data 143, an operating system kernel 144, a conflict handler 146, a conflict register 148, and work units 150. Although the applications 140, the shared data 143, the operating system kernel 144, the conflict handler 146, the conflict register 148, and the work units 150 are illustrated as being contained within the memory 102 in the node computer system 100, in other embodiments some or all of them may be on different computer system nodes and may be accessed remotely, e.g., via the network 155. The computer system node 100 may use virtual addressing mechanisms that allow the programs of the computer system 100 to behave as if they only have access to a large, single storage entity instead of access to multiple, smaller storage entities. Thus, while the applications 140, the shared data 143, the operating system kernel 144, the conflict handler 146, the conflict register 148, and the work units 150 are illustrated as being contained within the main memory 102, these elements are not necessarily all completely contained in the same storage device at the same time. Further, although the applications 140, the shared data 143, the operating system kernel 144, the conflict handler 146, the conflict register 148, and the work units 150 are illustrated as being separate entities, in other embodiments some of them, portions of some of them, or all of them may be packaged together.

In various embodiments, the application 140 is a user application, a third-party application, an operating system, or any portion, multiple, or combination thereof. The application 140 is partitioned or divided into multiple threads 142. In an embodiment, some or all of the threads 142 contain different code from the same application. In an embodiment, some or all of the threads 142 may contain both code and data. As an example, an application that includes an iterative loop may be partitioned into multiple threads, each thread comprising the code that implements a different iteration of the loop and the data that is specific to its own iteration of the loop. In another embodiment, some or all of the threads contain different code from different applications. In another embodiment, some or all of the threads 142 comprise identical code, but the execution of the threads 142 on the processors may take different paths through the threads.

In an embodiment, the work units 150 are identical to a portion of the code in the threads. In another embodiment, the work units 150 identify or comprise requests or commands that the threads process, perform, or to which the threads produce results in response. In an embodiment, each of the work units 150 are executed in a different thread. In an embodiment, the work units 150 are age ordered from oldest to youngest corresponding to their occurrence from beginning to end (from top to bottom or first to last in a sequence listing) in the original sequential application program 140. In another embodiment, the work units 150 are ordered from oldest to youngest corresponding to the time at which they were received from a requestor, which requested that the work units 150 be executed.

The work units 150 in the threads 142 are executed speculatively by the cores 115, and the cores 115 atomically modify the shared data 143 in response to the execution of the work units 150. Atomically updating the shared data 143 means that changes to the shared data 143 are kept pending and buffered in the cache 125 until the thread determines that the data accessed by the thread is to be committed and written to the shared data 143. All of the updates in the cache 125 made by a particular thread are either committed to the shared data 143 at once or they are discarded, resulting in the changes being aborted or rolled back. Thus, in an atomic update, the execution of multiple operations within the work unit 150 appear to be executed together without any intervening operations, which is also known as the atomicity property of a work unit 150. Thus, if a thread uses an atomic work unit 150 to access a set of memory addresses, the atomic work unit 150 guarantees that another thread cannot modify any of the memory addresses throughout the execution of the atomic work unit 150.

The conflict handler 146 is reentrant, and an instance of the conflict handler 146 executes within each thread 142. For speculative execution, the thread and/or the conflict handler 146 instructs the chip 101 whether to commit the thread's data in the cache 125 or to discard the data. Thus, the chip 101 detects conflicts between work units that attempt to access the same memory location, and the thread and/or the conflict handler 146 decide whether or commit or discard the buffered data that was written by the work units that conflict. The word "buffer," as used herein, means that the speculative writes made to the cache 125 are not automatically updated to the memory 102. This data written by these speculative writes is kept in the cache 125, until the thread and/or the conflict handler 146 instruct the chip 101 whether to commit the contents of the cache 125 to the shared data 143 in the memory 102 or to roll back the execution of the work unit 150 and discard the work unit's data.

The functional aspects of thread-level speculation may include the start of a new work unit 150, conflict detection, rollback, and ordered commit. Start of a new work unit 150 refers to a mechanism to create a speculative execution context, define the work unit's position in the speculation order, and start execution of the work unit 150. Conflict detection refers to a mechanism to detect data dependence violations among threads. Rollback refers to a mechanism to restart the work unit 150 in response to a conflict event and discard the data that was written by execution of the work unit 150 to the cache 125, without making the data visible or accessible to other work units 150 or threads. Ordered commit refers to a mechanism that controls the order in which data written by the execution of work units 150 is copied from the cache 125 to the main memory 102 and becomes visible and accessible by other work units 150 and other threads.

In various embodiments, the shared data 143 is implemented as a file, an object, a database, a data structure, an array, a document, a folder, a library, a directory, a subdirectory, or any combination, multiple, or hierarchy thereof. The shared data 143 is accessed (read from and written to) by multiple of the threads 142 when executed by the processors.

In an embodiment, the conflict register 148 is implemented as memory mapped I/O (Input/Output). The chip 101, the processors of the cores 115, and/or the cache controller 130 write/read or send/receive data values to/from the conflict register 148 as the threads execute, in order to represent the status of various conflicts that may occur between different threads as the different threads access the same storage locations. The threads read the conflict status of threads from the conflict register 148 and use the conflict status, in order to determine the action needed to resolve conflicts between threads and to determine whether to abort, rollback, and restart the execution of work units 150 or commit the cached data for the work units 150 to the shared data 143.

The conflict register 148 represents conflicts that have occurred between work units 150 in worker threads. In response to detecting conflicts between threads as the threads execute on the processors, the chip 101 sets values into the conflict register 148, raises and sends an asynchronous conflict event interrupt to the kernel 144, and stops executing the work unit 150 in the thread at the current instruction at which the chip 101 detected the conflict. In an embodiment, the chip 101 may change the fields in the conflict register 148 at any time, even during conflict resolution, as the various other threads execute.

The following are examples of the conflicts that the chip 101 detects and reports with a conflict event and conflict status in the conflict register, in various embodiments:

a read from a storage location requested by a work unit 150 in a younger worker thread followed (later in time) by a write to the same storage location (having the same address within the memory 102) that is requested by a work unit 150 in an older worker thread;

a write to a storage location requested by a work unit 150 in a younger worker thread followed (later in time) by write to the same storage location (having the same address within the memory 102) that is requested by a work unit 150 in an older worker thread; and a write to a storage location requested by a work unit 150 in a younger thread followed (later in time) by a read to the same storage location (having the same address within the memory 102) that is requested by a work unit 150 in an older worker thread, wherein the older worker thread is older than the younger worker thread.

The storage locations described in the aforementioned detected conflicts are locations within the memory 102 that the execution of the worker threads has requested to access, even though the read or write may have been performed from or to the cache 125 since conflicts are detected prior to committing, writing, or copying the data to the memory 102.

The kernel 144 comprises an operating system or a portion of an operating system. The kernel 144 receives and responds to interrupts generated by the chip 101.

In an embodiment, the threads 142, the kernel 144, the conflict handler 146 and/or the work units 150 comprise instructions or statements that execute on the processors or instructions or statements that are interpreted by instructions or statements that execute on the processors, to carry out the functions as further described below with reference to FIGS. 3, 4, 5, 6, 7, 8, 9, and 10. In an embodiment, the threads 142, the kernel 144, the conflict handler 146 and/or the work units 150 also comprise data in addition to instructions or statements. In another embodiment, the threads 142, the kernel 144, and/or the conflict handler 146 are implemented in hardware via semiconductor devices, chips, logical gates, circuits, circuit cards, and/or other physical hardware devices.

In various embodiments, the disk devices 150 are implemented as disk drives, direct access storage devices, rotating magnetic disk drive storage devices, arrays of disk drives configured to appear as a single large storage device to a host computer, or any type of secondary storage device. The contents of the main memory 102, or any portion thereof, may be stored to and retrieved from the disk devices 150, as needed.

Although the bus 103 is shown in FIG. 1 as a relatively simple, single bus structure providing a direct communication path among the chip 101, the main memory 102, and the disk devices 150, in fact the bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, bus 103 may comprise a memory bus, an I/O bus, I/O bus interface units, I/O processors, or any multiple and/or combination thereof.

In various embodiments, the node computer systems 100 are multi-user mainframe computer systems, single-user systems, or server computers or similar devices that have little or no direct user interface, but receive requests from other computer systems (clients). In other embodiments, the node computer systems 100 are implemented as desktop computers, portable computers, laptop or notebook computers, tablet computers, pocket computers, telephones, smart phones, pagers, automobiles, teleconferencing systems, appliances, or any other appropriate type of electronic devices.

In an embodiment, the nodes 100 are logically arranged in a three-dimensional lattice, each node having a respective x, y and z coordinate. Each node 100 in the lattice contains a set of node-to-node communication links for communicating data with its immediate neighbors in the x, y and z coordinate dimensions. As used herein, the term "lattice" includes any regular pattern of nodes 100 and inter-nodal data communications paths in more than one dimension, such that each node 100 has a respective defined set of neighbors, and such that, for any given node, it is possible to algorithmically determine the set of neighbors of the given node from the known lattice structure and the location of the given node in the lattice. A "neighbor" of a given node 100 is any node 100 which is linked to the given node 100 by a direct inter-nodal data communications path, i.e. a path which does not have to traverse another node. The lattice structure is a logical one, based on inter-nodal communications paths. It is not necessarily true that a given node's neighbors are physically the closest nodes 100 to the given node 100, although it is generally desirable to arrange the nodes 100 in such a manner, insofar as possible, as to provide physical proximity of neighbors.

In one embodiment, the node lattice logically wraps to form a 3D (three dimensional) torus in all three coordinate directions, and thus has no boundary nodes. For example, if the node lattice contains $dim_x$ nodes in the x-coordinate dimension ranging from 0 to ($dim_x$−1), then the neighbors of Node(($dim_x$−1), y0, z0) include Node(($dim_x$−2), y0, z0) and Node (0, y0, z0), and similarly for the y-coordinate and z-coordinate dimensions. In other embodiments, a logical torus without boundary nodes is not necessarily a requirement of a lattice structure.

This aggregation of node-to-node communication links is referred to herein as the torus network. The torus network permits each node 100 to communicate results of data processing tasks to neighboring nodes for further processing in certain applications which successively process data in different nodes 100. But, the torus network contains only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes 100 within any block may execute a common application code function or sequence.

The network 155 may be any suitable network or combination of networks and may support any appropriate protocol suitable for communication of data and/or code to/from the nodes 100. In an embodiment, the network 155 may be implemented via an Ethernet network, but in other embodiments any appropriate network or combination of networks implementing any appropriate protocol may be used. In another embodiment, the network 155 may represent a storage device or a combination of storage devices, either connected directly or indirectly to the nodes 100.

Although only the network 155 is illustrated, in other embodiments additional networks may be present, such as the 3D torus network described above for point-to-point communication between the nodes 100 and a global barrier and interrupt network. Further the nodes 100 may be of any appropriate type and a variety of types, such as a compute node, a service node, an I/O (Input/Output) node, and some of the nodes may be connected via different networks.

It should be understood that FIG. 1 is intended to depict the representative major components of the nodes 100, the network 155, and the disk devices 150 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc that are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the disk device 150), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
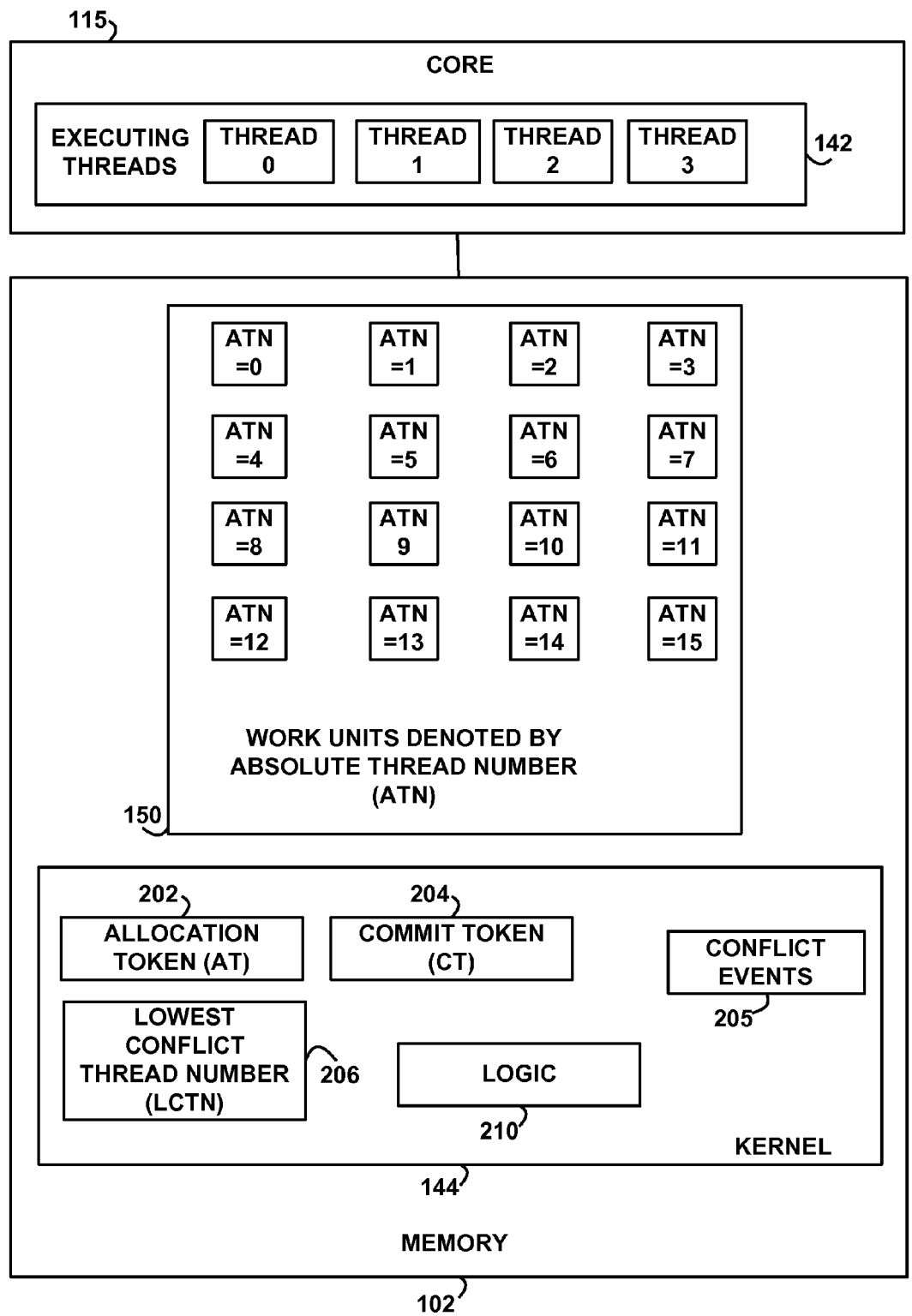
FIG. 2 depicts a block diagram illustrating the interaction of selected components of an embodiment of the invention.

FIG. 2 depicts a block diagram illustrating the interaction of selected components of an embodiment of the invention. The selected components of FIG. 2 include the core 115 and the memory 102. The core executes instructions in the threads 142. In an embodiment, each of the processors in the core executes only one thread at a time, but in another embodiment, the execution of any number of threads may be interleaved on a single processor.

The memory 102 stores or encodes the kernel 144 and the work units 150. The work units 150 are uniquely identified by absolute thread number (ATN). In an embodiment, the ATN represents the age of the work unit 150 by age order, with the lowest ATN indicating the oldest work unit and the highest ATN representing the youngest work unit. But, in another embodiment, the age of the work unit 150 is tracked separately from the ATN, e.g., stored as a time stamp in the work unit 150 or in a data structure separate from the work unit 150.

In an embodiment, the ATN represents the thread number of the thread executed by the core to which the work unit 150 would be assigned if the core were capable of executing an infinite number of hardware threads. Since the core is capable of executing a finite number of threads, the threads 142 executing in the core 115 accept work units 150 in a round-robin fashion, meaning that in response to a thread in the core performing a commit operation, the thread receives and begins executing the oldest work unit that is not being executed by a core thread or that is not assigned to a core thread for execution, regardless of whether the work unit 150 is actually executing or is current halted or waiting.

The memory 102 includes the kernel 144, which comprises an allocation token (AT) 202, a commit token (CT) 204, conflict events 205, a lowest conflict thread number (LCTN) 206, and logic 210.

If the allocation token (AT) 202 is a positive number, then the AT 202 indicates the ATN that is next to start executing, i.e., a positive AT 202 indicates the oldest ATN of an oldest work unit that has been allocated to a worker thread, but the execution of that oldest work unit has not yet started or the execution of that oldest work unit has been rolled back and has not yet been restarted.

If the AT 202 is a negative number, then the absolute value of the AT 202 indicates the number of threads that need to be invalidated, i.e., the number of work units 150 that need to be rolled back and restarted. A negative AT 202 prohibits new work units and work units that have been rolled back from starting execution, but does not cause currently executing work units 150 to halt execution.

If the AT 202 is zero, then the AT 202 indicates that the next work unit to start executing is the oldest work unit that has been allocated to a thread in the core 115, but is not currently executing either because the execution of the work unit 150 has not yet started or because the execution of the work unit 150 has been rolled back and has not yet restarted.

The commit token (CT) 204 indicates the ATN of the next work unit to commit and is incremented from older to younger ATNs of the work units 150, and this incrementing creates an order of commit operations among the work units 150 from older to younger.

A conflict event (CE) 205 is an interrupt that represents a conflict, which is raised by the chip 101 or by a worker thread (as further described below with reference to FIG. 7) and sent to the kernel 144. The conflict events 205 are asynchronous interrupts, meaning that the kernel 144 that receives them cannot predict or determine the time at which the asynchronous conflict event 205 occurs because the kernel 144 executes outside of the worker thread whose execution of a work unit performs the reads/writes that cause the conflict with another worker thread. Executing outside of the worker thread means that the execution of the kernel 144 does not share memory with the worker thread or cannot access the data of the worker thread, the kernel 144 executes in a different process from the worker thread, and the processor that executes the worker thread does a context switch in order to stop executing the worker thread and start executing the kernel 144. In a context switch, the processor saves the process-specific data (registers, memory maps, instruction pointer or program counter, etc.) of one process and loads the process-specific data of another process.

The chip 101 only sends or raises one conflict event that represents a particular conflict, and the conflict event identifies only the work unit (the ATN) of the younger thread that conflicts, not the work unit of the older thread, with which the younger thread conflicts. Similarly, only the younger worker thread (as described below with reference to FIG. 7) and not the older worker thread, with which the younger worker thread conflicts, sends a conflict event to the kernel 144. After the expiration of the rollback period in which the kernel 144 receives the conflict events, the threads roll back their work units 150 for all threads starting from the oldest thread that was identified by a conflict event (identified in the LCTN 206) through all threads that execute work units 150 that are younger than the LCTN 206.

The lowest conflict thread number (LCTN) 206 identifies the smallest or oldest ATN of a work unit whose execution in a worker thread encountered a conflict and caused a conflict event to be raised to the kernel 144, among all conflict events that were raised during a previous rollback time period. The LCTN 206 indicates the work unit with which the next round of rollbacks should start. The logic 210 comprises statements or instructions that when executed on the processor or interpreted by instructions that execute on the processor carry out the functions of an embodiment of the invention.

Figure 3:
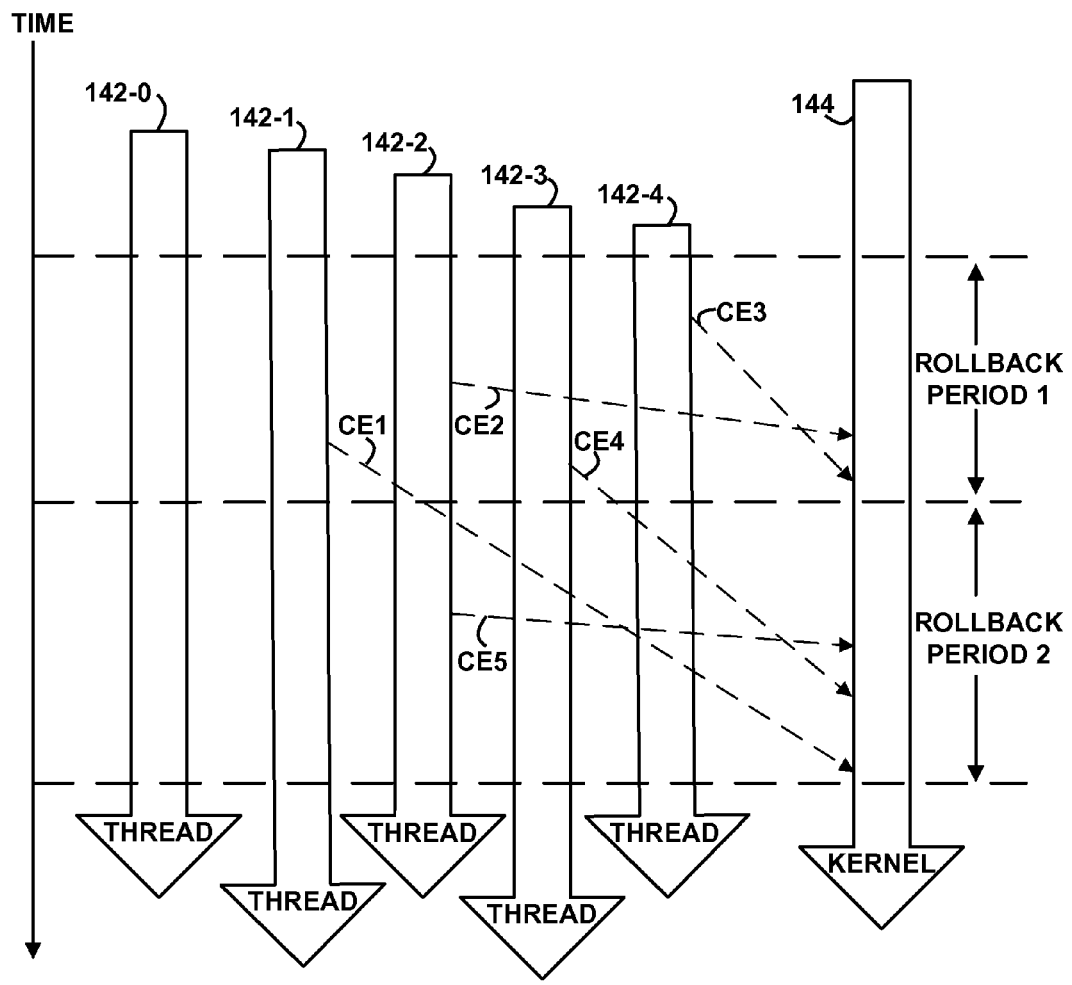
FIG. 3 depicts a graph of example thread execution of worker threads over time with resulting conflict events sent to a kernel, according to an embodiment of the invention.

FIG. 3 depicts a graph of example thread execution of worker threads over time with resulting conflict events sent to the kernel 144, according to an embodiment of the invention. The example graph of FIG. 3, with time on the vertical axis starting at an earlier time at the top of the graph and moving to later times towards the bottom of the graph, illustrates the execution over time of the worker threads 142-0, 142-1, 142-2, 142-3, and 142-4 and the kernel 144. The worker threads 142-0, 142-1, 142-2, 142-3, and 142-4 are examples of the threads 142 (FIG. 1).

For ease of illustration, the worker threads 142-0, 142-1, 142-2, 142-3, and 142-4 are ordered on the graph from left-to-right starting with the oldest worker thread 142-0 (the worker thread 142-0 received the oldest work unit, meaning the work unit 150 that was received at the earliest time or that would be executed first in a sequential execution of the application 140) and ending with the youngest worker thread 142-4 (the worker thread 142-4 received the youngest work unit, meaning the work unit 150 that was received at the latest time, or that would be executed last in a sequential execution of the application 140, as compared to the oldest work unit). The worker thread 142-1 is younger than the worker thread 142-0, the worker thread 142-2 is younger than the worker thread 142-1, the worker thread 142-3 is younger than the worker thread 142-2, and the worker thread 142-4 is younger than the worker thread 142-3.

The example graph of FIG. 3 illustrates first and second rollback periods. The rollback period is the time period between two consecutive sets or rounds of rollback operations. In various embodiments, the rollback period is the time period as measured by a clock or as represented by a threshold number of conflict events, or as represented by the satisfaction of any other appropriate condition or criteria.

The graph of FIG. 3 further illustrates that the execution of the thread 142-2 causes the chip 101 to send the conflict event CE5 during the second rollback period, and the kernel 144 receives the conflict event CE5 during the second rollback period. The execution of the thread 142-1 causes the chip 101 to send the conflict event CE1 during the first rollback period, and the kernel 144 receives the conflict event CE1 during the second rollback period. The execution of the thread 142-2 causes the chip 101 to send the conflict event CE2 during the first rollback period, and the kernel 144 receives the conflict event CE2 during the first rollback period. The execution of the thread 142-3 causes the chip 101 to send the conflict event CE4 during the first rollback period, and the kernel 144 receives the conflict event CE4 during the second rollback period. The execution of the thread 142-4 causes the chip 101 to send the conflict event CE3 during the first rollback period, and the kernel 144 receives the conflict event CE3 during the first rollback period. Thus, various of the conflict events were received by the kernel 144 in the same or different order and/or rollback time period from which they were sent by the chip 101.

Upon receiving a conflict event, the kernel 144 does not necessarily start a rollback operation immediately. Instead, the kernel 144 waits until after the end of a rollback period and then launches a round of rollback operations for some selected threads. Thus, the kernel 144 merges the conflict events that are received during a rollback period, and the kernel 144 initiates a set or round of rollbacks for those merged conflict events after the start of the next (in time) rollback period. Thus, in the example of FIG. 3, the conflict events CE2 and CE3 are received by the kernel 144 during the first rollback period, so the kernel 144 starts a round of rollbacks upon the start of the next rollback period (the start of the second rollback period), which is after the expiration of the first rollback period. The conflict events CE1, CE4, and CE5 are not received by the kernel 144 until the second rollback period, despite the fact that CE1 and CE4 were sent during the first rollback period, so the kernel 144 starts a round of rollbacks after the expiration of the second rollback period.

In addition, the eagerness of rollback is controlled by setting the rollback period accordingly. A rollback period that is as small as one conflict event provides the most eager rollback technique. The least eager rollback technique is to allow the oldest conflicting thread to wait until it is the next thread to be committed, or in other words, rollback when the condition LCTN=CT is met. If the rollback time period is too short, then rollbacks are done too eagerly, and resources can be wasted with repetitive processing. If the rollback time period is too long, then the performance may be negatively impacted because the execution of threads must be suspended, waiting for the rollbacks to occur.

Merging conflicts guarantees correctness, even though the conflicts arrive at the kernel 144 out-of-order from the order they were sent by the chip, as further explained below. Suppose conflict events are marked as CE(n,t), where n is the rollback starting thread number, which is the oldest thread that should be rolled back, and t is the wall time when the rollback occurs. The kernel 144 performs a round of rollbacks periodically, at the start of rollback periods. Suppose a rollback round is marked as RB(n,t), where n is the rollback starting thread number, and t is the time the rollback round starts. The correctness of thread level speculation is guaranteed, so long as for any CE(n1,t1), a rollback round RB(n2,t2) exists, which satisfies t2>t1 and n2<=n1 because a later round of rollbacks always rolls back a work unit that caused an earlier conflict event.

The example of FIG. 3 illustrates that the conflict event CE3 is sent earlier but arrives later than the conflict event CE2, but CE2 and CE3 both still arrive at the kernel 144 during the first rollback time, so a rollback starting from the thread 142-2 (the execution of which caused CE2) is sufficient to guarantee correctness. The conflict events CE1 and CE4 are sent by the core during the first rollback time period, but due to the latency, CE1 and CE4 arrive at the kernel 144 during the second rollback time period. The conflict event CE5 is sent by the core in the second rollback time period and arrives at the kernel 144 during the same rollback time period. Thus, the kernel 144 merges CE1, CE4, and CE5. Although CE1 and CE4 arrive in a later rollback time period from the rollback time period in which they were sent, this does not cause any negative effect because CE has a rollback starting thread number smaller than CE5 and CE4 (thread 142-1 executes an older work unit than does threads 142-2 and 142-3), so rolling back work units starting at thread 142-1 and continuing through all younger threads also rolls back the work units of 142-2 and 142-3, which caused CE5 and CE4, respectively, so the correctness of thread-level speculation is guaranteed.

Figure 4:
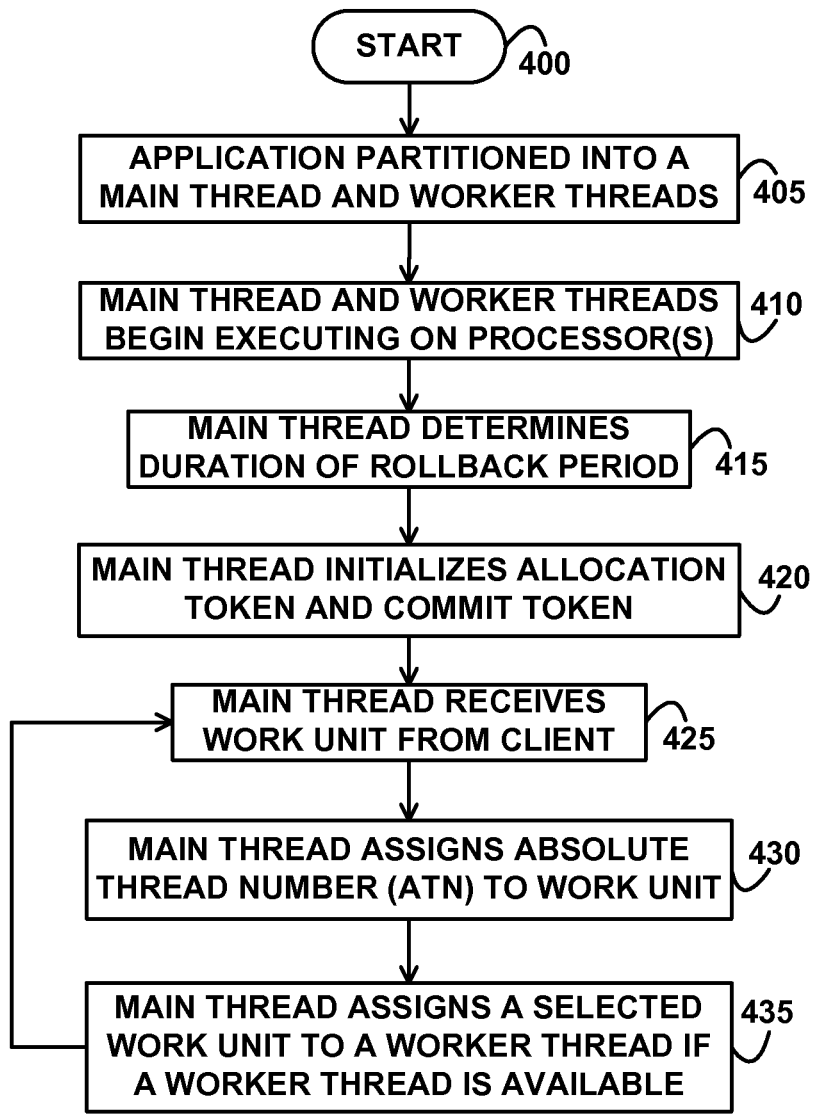
FIG. 4 depicts a flowchart of example processing for a main thread that assigns work units to worker threads, according to an embodiment of the invention.

FIG. 4 depicts a flowchart of example processing for a main thread that assigns work units to worker threads, according to an embodiment of the invention. Control begins at block 400. Control then continues to block 405 where a compiler or programmer partitions the application 140 into the threads 142, which comprise a main thread and a plurality of worker threads. Control then continues to block 410 where the main thread and the worker threads begin executing on the processors of the cores 115.

Control then continues to block 415 where the main thread determines the duration, size, or the length of the rollback time periods. In an embodiment, the main thread determines the size of the rollback time periods by reading the size from memory, receiving the size from a client node computer system via the network 155, or receiving the size from an I/O device.

In another embodiment, the main thread changes the duration and determines the duration of the rollback time periods from the historical number of conflict events that have occurred in historical rollback time periods. If the number of historical conflict events (or a median number of historical conflict events) in a historical rollback time period exceeds a first threshold, then the main thread reduces the duration of the rollback time period from the duration of the historical rollback time period (or from the duration of the median historical rollback time period). If the number of historical conflict events in the historical rollback time period is less than a second threshold (the second threshold being less than the first threshold), then the main thread increases the duration of the rollback time period from the duration of the historical rollback time period (or from the duration of the median historical rollback time period). If the number of historical conflict events in the historical rollback time period is between the first threshold and the second threshold, then the main thread does not change the duration of the rollback time period.

In another embodiment, the main thread determines the duration of the rollback time period based on a number of conflict events that the main thread estimates will occur in future time period, based on an estimated number of threads, an estimated number of ATNs, based on the type of work units 150 that are estimated to be received, based on a type of the application, based on a type of the client that sends the work requests, or based on any combination or multiple thereof. In an embodiment, the main thread changes the duration of some rollback periods but not other rollback periods.

Control then continues to block 420 where the main thread initializes the AT 202 and the CT 204 to be smallest or oldest possible ATN that the main thread later assigns.

Control then continues to block 425 where the main thread receives a work unit 150 from a client. In various embodiments, the client is one of the applications 140, an operating system, a compiler, or one of the nodes 100 connected via the network 155.

Control then continues to block 430 where the main thread assigns an absolute thread number (ATN) to the received work unit 150 that uniquely identifies the work unit 150, according to the order that the work units 150 would be executed during a sequential execution of the original sequential application program 140. That is, in an embodiment, the main thread assigns the ATNs (smallest to largest) to the work units in order from oldest to youngest corresponding to their occurrence from beginning to end (from top to bottom or first to last in a sequence listing) in the original sequential application program 140. Thus, the main thread assigns the smallest ATN to the oldest (first in sequential order) work unit and the largest ATN to the youngest (last in sequential) work unit, with each ATN being one less than the next youngest ATN.

Control then continues to block 435 where the main thread assigns or sends a selected work unit to a worker thread. In various embodiments, the main thread performs assignment of work units 150 to worker threads either statically before starting thread level speculation or dynamically at runtime. In an embodiment, the main thread uses a round-robin algorithm to assign work units 150 to threads, resulting in work units 150 being assigned in the order of their age, from oldest to youngest.

Control then returns to block 425 where the main thread receives another work unit 150 from a client, as previously described above. If another work unit 150 is not currently available, the main thread waits until another work unit 150 is received.

Figure 5:
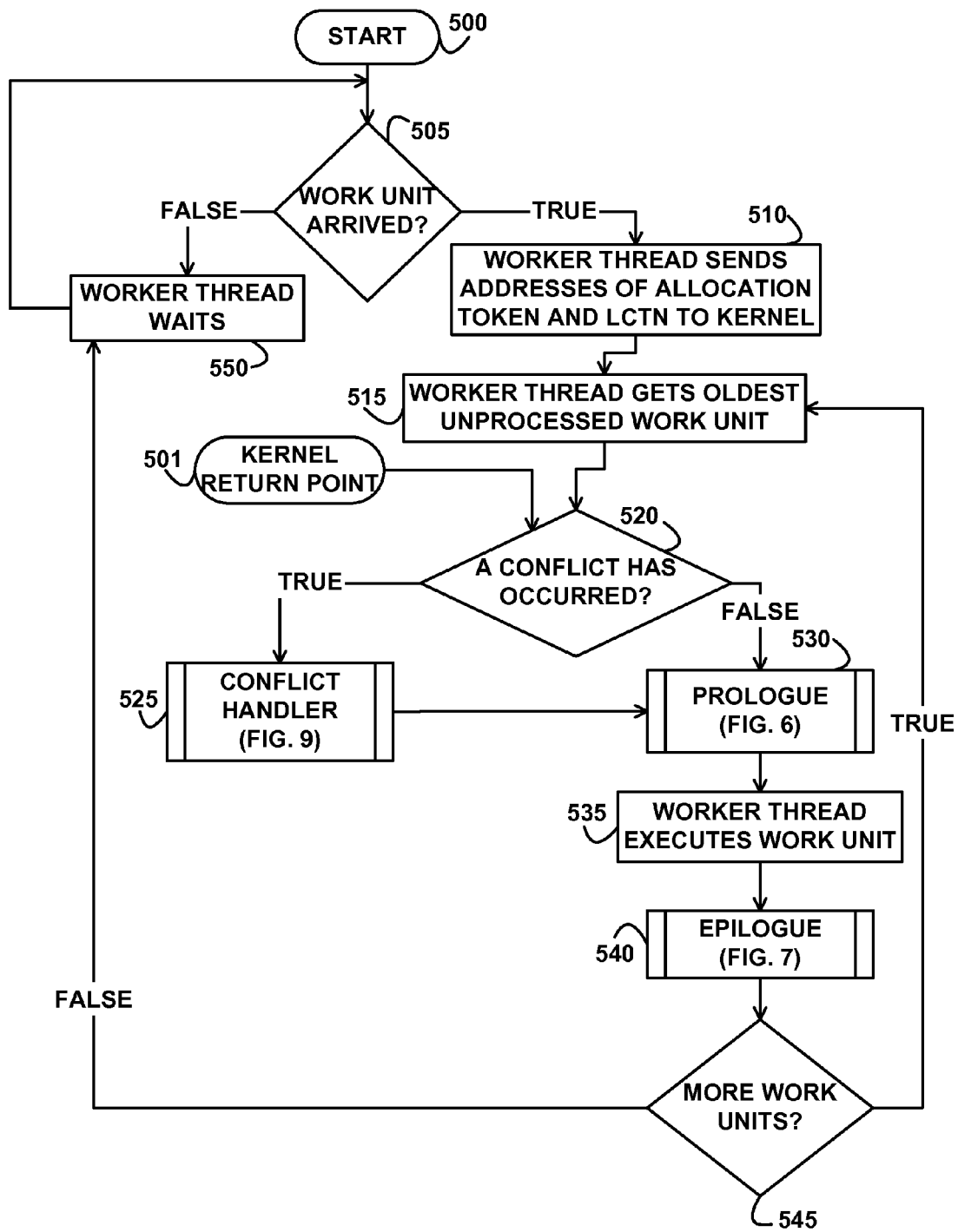
FIG. 5 depicts a flowchart of example processing for a worker thread that executes work units, according to an embodiment of the invention.

FIG. 5 depicts a flowchart of example processing for a worker thread that executes work units, according to an embodiment of the invention. The logic of FIG. 5 is reentrant and a different instance of the logic of FIG. 5 executes for each of the worker threads.

The term "current thread" or "current worker thread," as used herein, refers to the instance of the worker thread that is currently being described. The term "current work unit," as used herein, refers to the work unit that the current worker thread is currently processing or executing.

Control begins at block 500. Control then continues to block 505 where the current worker thread determines whether a current work unit has been received from the main thread or has been assigned to the current worker thread by the main thread. If the determination at block 505 is true, then a current work unit has been received from the main thread or has been assigned to the current worker thread by the main thread, so control continues to block 510 where the current worker thread sends the address of the AT 202 and the address of the LCTN 206 to the kernel 144.

Control then continues to block 515 where the current worker thread retrieves or reads the current work unit that was previously determined (at block 505) to have arrived or been assigned to the current worker thread, which is the oldest unprocessed work unit. The current worker thread sets its thread number to be the ATN of the retrieved current work unit. Thus, as used herein, the thread numbers of worker threads are referred to as the ATN of the current work unit that the current worker thread executes. Control then continues to block 520 where the current worker thread determines whether a conflict has occurred that was encountered by the execution of the current work unit and for which the chip 101 sent a conflict event that identified the ATN of the current thread. The current worker thread performs the determination of block 520 by reading the conflict register 148, which indicates whether the current worker thread encountered a conflict with a thread that is older than the current worker thread. If the current worker thread encountered a conflict with an older thread, the conflict register 148 is set, which indicates that the current worker thread encountered a conflict. If the current worker thread encountered a conflict with a younger thread or the current worker thread did not encounter a conflict, the conflict register 148 is cleared, which indicates that the current worker thread did not encounter a conflict. In other embodiments, any appropriate values in the conflict register 148 may be used to indicate whether or not the current worker thread encountered a conflict.

If the determination at block 520 is true, then the current work unit executing in the current worker thread encountered a conflict with an older work unit executing in an older thread, so control continues to block 525 where the conflict handler 146 handles the conflict, as further described below with reference to FIG. 9. Control then continues to block 530 where the prologue code of the current worker thread executes, as further described below with reference to FIG. 6.

Control then continues to block 535 where the current worker thread processes or executes the current work unit. As the current worker thread processes the current work unit by executing thread logic on the processor, the cache controller 130 detects conflicts between threads and, in response, sends conflict events to the kernel 144, which are handled as further described below with reference to FIG. 8.

Referring again to FIG. 5, control then continues from block 535 to block 540 where the epilogue code of the current worker thread executes, as further described below with reference to FIG. 7. Control then continues to block 545 where the current worker thread determines whether another work unit has been received from the main thread.

If the determination at block 545 is true, then a next work unit has been received from the main thread, so control returns to block 515 where the current worker thread retrieves the oldest unprocessed work unit, which becomes the current work unit, which is processed as previously described above.

If the determination at block 545 is false, then another work unit has not been received from the main thread, so control continues to block 550 where the current worker thread waits for a period of time. Control then returns to block 505 where the current worker thread determines whether a next work unit has arrived from the main thread, as previously described above. Once the next work unit arrives, it becomes the current work unit and is processed, as previously described above.

If the determination at block 520 is false, then the current work unit executing in the current worker thread did not encounter a conflict with an older work unit executing in an older thread, so control continues to block 530 where the current worker thread executes the prologue code, as further described below with reference to FIG. 6, without invoking the conflict handler 146 at block 525. Control then continues from block 530 to block 535, as previously described above.

If the determination at block 505 is false, then a work unit has not been received from the main thread or has not been assigned to the current worker thread by the main thread, so control continues to block 550 where the current worker thread waits for a period of time, as previously described above.

The kernel return point 501 is the label of the location or address within the code of the current worker thread of FIG. 5, to which the execution of the current worker thread jumps (from whatever instruction the current worker thread previously executed), in response to the kernel 144 initiating a round of rollbacks that includes the current worker thread, as further described below with reference to FIG. 8. Since the kernel return point 501 points to the block 520, the current worker thread jumps to block 520, in response to the kernel 144 initiating a round of rollbacks that includes the current worker thread.

Figure 6:
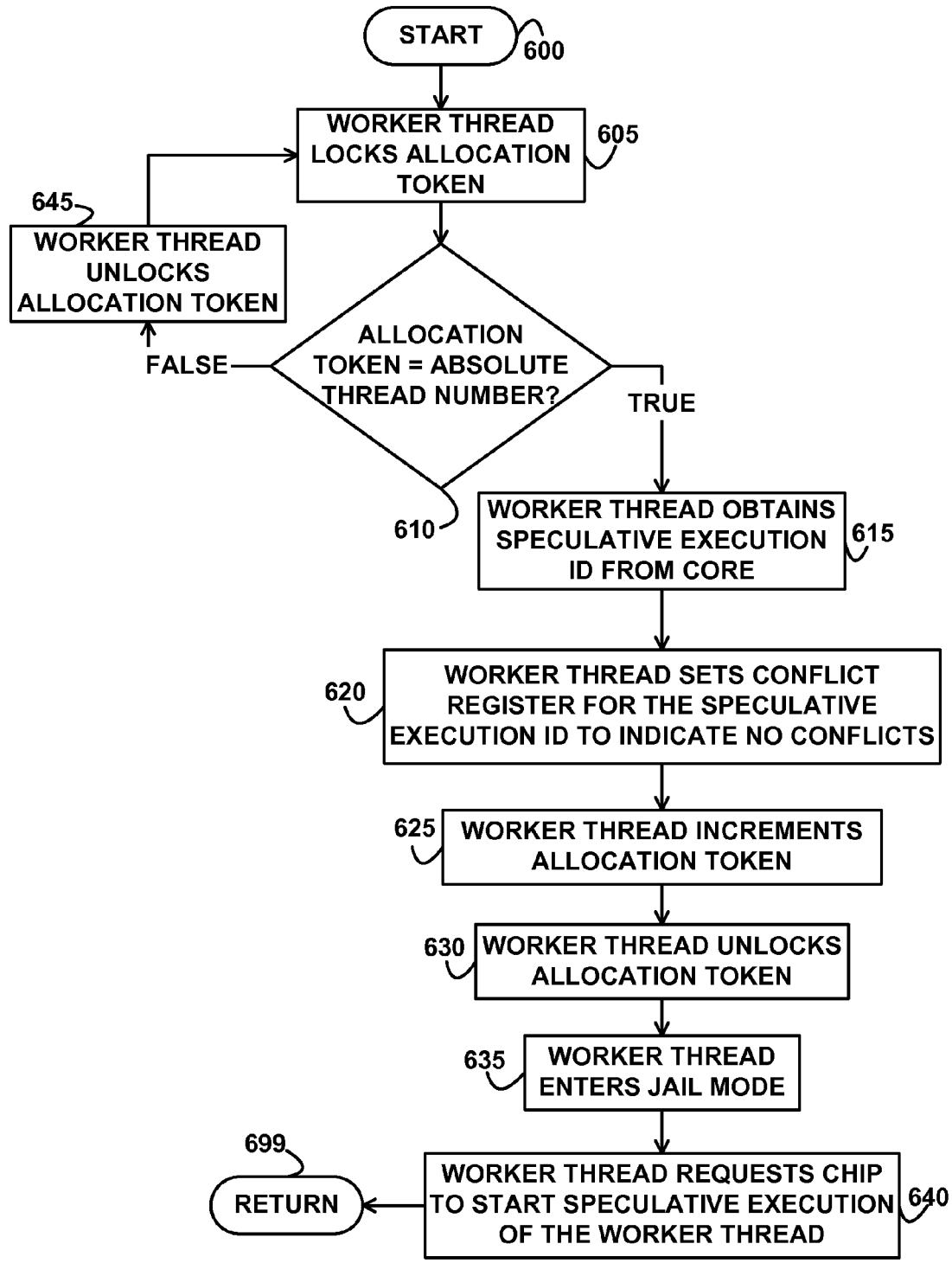
FIG. 6 depicts a flowchart of example processing for prologue code within a worker thread, according to an embodiment of the invention.

FIG. 6 depicts a flowchart of example processing for prologue code within a worker thread, according to an embodiment of the invention. The logic of FIG. 6 is reentrant and a different instance and invocation of the logic of FIG. 6 executes for each of the worker threads. The term "current worker thread," as used herein, refers to the instance of the worker thread that is currently being described. The term "current work unit," as used herein, refers to the work unit that the current worker thread is currently processing.

Control begins at block 600. Control then continues to block 605 where the current worker thread locks the AT 202. Locking the AT 202 means that the current worker thread has exclusive access to the AT 202 and that other threads and the kernel 144 are prevented from obtaining a lock and prevented from reading/writing data values from/to the AT 202. If the current worker thread cannot obtain a lock on the AT 202 because the AT 202 is locked by another worker thread or by the kernel 144, then the current worker thread waits at block 605 for the other worker thread or the kernel 144 to unlock the AT 202, so that the current worker thread can lock the AT 202.

After the lock has been obtained on the AT 202, control continues to block 610 where the current worker thread determines whether the AT 202 equals the absolute thread number (ATN) of the current worker thread. That is, the current worker thread determines whether the next absolute thread number scheduled to next start executing identifies itself (the current worker thread).

If the determination at block 610 is true, then the AT 202 equals the absolute thread number of the current worker thread, so control continues to block 615 where the current worker thread obtains a speculative execution identifier from the core 115 on which the current worker thread executes. The speculative execution identifier uniquely identifies the current worker thread and identifies memory accesses performed by the current worker thread. Each speculatively executed thread has a different speculative execution identifier. Thus, by operation of blocks 610 and 615 in multiple instances of the worker threads, each worker thread waits to enter speculation mode until the AT 202 equals to the ATN of that worker thread's work unit.

Control then continues to block 620 where the current worker thread sets the conflict register 148 for the speculative execution identifier to indicate that no conflicts exist between the current worker thread and other threads.

Control then continues to block 625 where the current worker thread increments the AT 202. Incrementing the AT 202 causes the AT 202 to identify the next younger work unit, but in other embodiments, any appropriate technique can be used to set the AT 202 to indicate the next younger work unit, such as finding the work unit with the time stamp that is next younger from the current work unit. Changing the value in the AT 202 to indicate the next younger work unit allows the worker thread that holds the next younger work unit (than the current worker thread) to start executing.

Control then continues from block 625 to block 630 where the current worker thread unlocks the AT 202, which allows another thread, e.g., a different instance of the logic of FIG. 6 or the kernel 144 or the conflict handler 146 (as further described below with reference to FIGS. 8 and 9) to obtain a lock on and exclusive access to the AT 202.

Control then continues to block 635 where the current worker thread enters jail mode. Entering jail mode causes the kernel 144 to monitor the execution of the current worker thread for system calls and memory accesses that, if completed, would cause irrevocable actions that could not be rolled back. Examples of such actions include the sending of data to the network 155 or the disk device 150. If the kernel 144 detects such attempted system calls and memory accesses, the kernel 144 causes an irrevocable action interrupt, which results in the current work unit in the current worker thread and all incomplete (uncommitted) work units to be aborted and re-executed sequentially.

Control then continues to block 640 where the current worker thread requests the chip 101 that executes the current worker thread to start speculative execution of the current worker thread. Starting speculative execution for the current worker thread means that the chip 101 enters speculative execution mode for the current worker thread and tags, logs, or associates all memory accesses (reads/writes from/to the memory 102) subsequently requested by the current worker thread with the speculative execution identifier and stores or buffers the data read or written along with the speculative execution identifier into the cache 125, but does not write the data to the memory 102 until the data is later committed. The core further detects conflicts between the speculatively executed current worker thread and other threads that request to access the same location in the memory 102 and sends conflict event interrupts that represent those conflicts to the kernel 144.

Control then continues to block 699 where the current instance of the logic of FIG. 6 returns.

If the determination at block 610 is false, then the AT 202 does not equal the absolute thread number (ATN) of the current work unit, so control continues to block 645 where the current worker thread unlocks the AT 202. Control then returns to block 605 where the current worker thread locks the AT 202, as previously described above. Thus, the logic of block 610 in combination with the logic of blocks 625 and 640 causes the worker threads that execute different instances of the logic of FIG. 6 to start speculative execution of their respective work units 150 in age order of the work units 150, starting with the oldest and proceeding towards the youngest.

Figure 7:
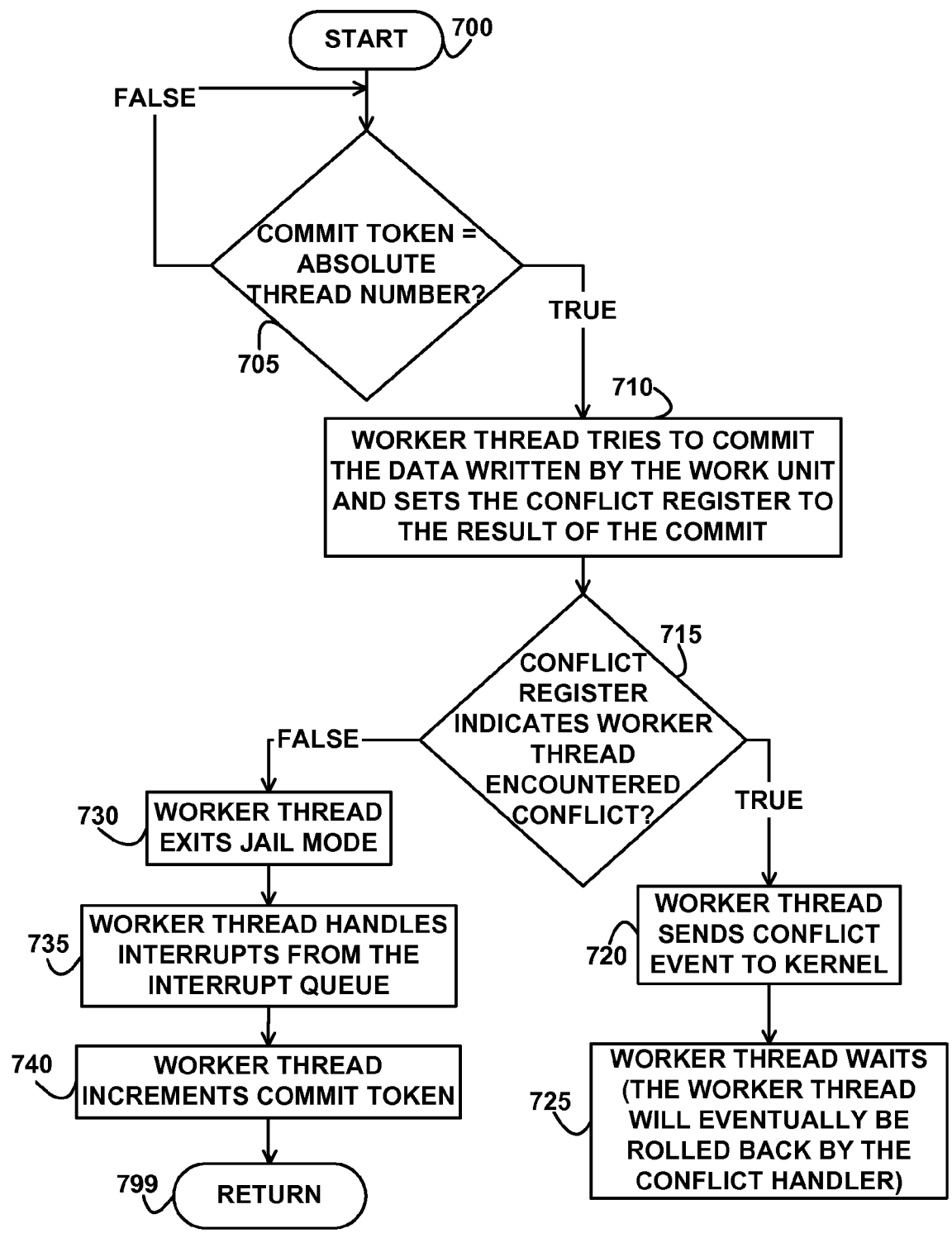
FIG. 7 depicts a flowchart of example processing for epilogue code within a worker thread, according to an embodiment of the invention.

FIG. 7 depicts a flowchart of example processing for epilogue code within a worker thread, according to an embodiment of the invention. The logic of FIG. 7 is reentrant and a different instance of the logic of FIG. 7 executes in each worker thread. The term "current worker thread," as used herein, refers to the instance of the thread that is currently being described. The term "current work unit," as used herein, refers to the work unit that the current worker thread is currently processing.

Control begins at block 700. Control then continues to block 705 where the current worker thread determines whether the commit token (CT) 204 equals the absolute thread number (ATN) of the current worker thread. That is, the current worker thread determines whether next absolute thread number identifying the next work unit that is scheduled to commit is the current work unit that is executed by the current worker thread.

If the determination at block 705 is true, then the CT 204 equals the ATN of the current worker thread, so control continues to block 710 where the current worker thread requests the chip 101 to perform a commit operation. Requesting the chip 101 to perform a commit operation requests the chip 101 to copy the data that the execution of the current work unit wrote to the cache 125 into the shared data 143 of the memory 102. The chip 101 sets the conflict register 148 to be the conflict status that results from the request of the commit operation. If the commit operation was successful, then the current work unit did not encounter a conflict with an older work unit, so the chip 101 copied the current work unit's data from the cache 125 to the memory 102. If the commit operation was unsuccessful, then the current work unit did encounter a conflict with an older work unit, so the chip 101 did not copy the current work unit's data from the cache 125 to the memory 102.

Control then continues to block 715 where the current worker thread determines whether the conflict register 148 indicates that the current work thread encountered a conflict.

If the determination at block 715 is true, then the current work unit executing in the current worker thread encountered a conflict with an older work unit executing in an older worker thread, so control continues to block 720 where the current worker thread sends a conflict event, which identifies the current work unit in the current worker thread, to the kernel 144, which receives and processes the conflict event, as further described below with reference to FIG. 8.

Control then continues to block 725 where the current work thread halts execution and waits. The conflict handler 146 eventually rolls back the current work unit in the current worker thread, in response to the conflict event previously sent at block 720, as further described below with reference to FIGS. 8 and 9.

Referring again to FIG. 7, if the determination at block 715 is false, then the current work unit executing in the current worker thread either encountered a conflict with a younger work unit executing in a younger worker thread, or the current work unit did not encounter a conflict with another work unit executing in another worker thread, so control continues to block 720 where the current worker thread exits jail mode. Exiting jail mode causes the kernel 144 to no longer monitor the current worker thread for system calls and memory accesses that, if completed, would cause irrevocable actions.

Control then continues to block 735 where the current worker thread handles interrupts from the interrupt queue. Examples of the handled interrupts include divide-by-zero and integer overflow interrupts. Time interrupts, which cause invocation of FIG. 8, are not in the interrupt queue and are not handled by the current worker thread in FIG. 7.

Control then continues to block 740 where the current worker thread increments the CT 204 or changes the CT 204 to specify the worker thread that is next younger than the current worker thread. Control then continues to block 799 where the logic of FIG. 7 returns.

Thus, the epilogue code of FIG. 7 enforces an order of commit operations using the CT 204. The instances of the epilogue code perform commit operations starting from the thread with the oldest or smallest ATN and progressing towards the thread with the youngest or largest ATN. If one of the instances of the epilogue code detects a conflict between its current worker thread and another, older worker thread, then the epilogue code for that current worker thread waits to be rolled back (at block 725), which means that instance does not increment the CT 204 (at block 740), which prevents younger threads (those threads younger than that current worker thread) from committing until that current worker thread is rolled back, re-executes, and commits. The logic illustrated in FIG. 7 in combination with the fact that when two worker threads conflict, the chip 101 does not report the older worker thread as having encountered a conflict implies that if the execution of the oldest worker thread in any rollback time period reaches the epilogue code, the oldest worker thread is committed and is not rolled back. That is, if the oldest worker thread is the current worker thread, then the commit of block 710 is successful and the false leg of block 715 is taken, so a conflict event that would identify the oldest worker thread is not sent by block 720.

Figure 8:
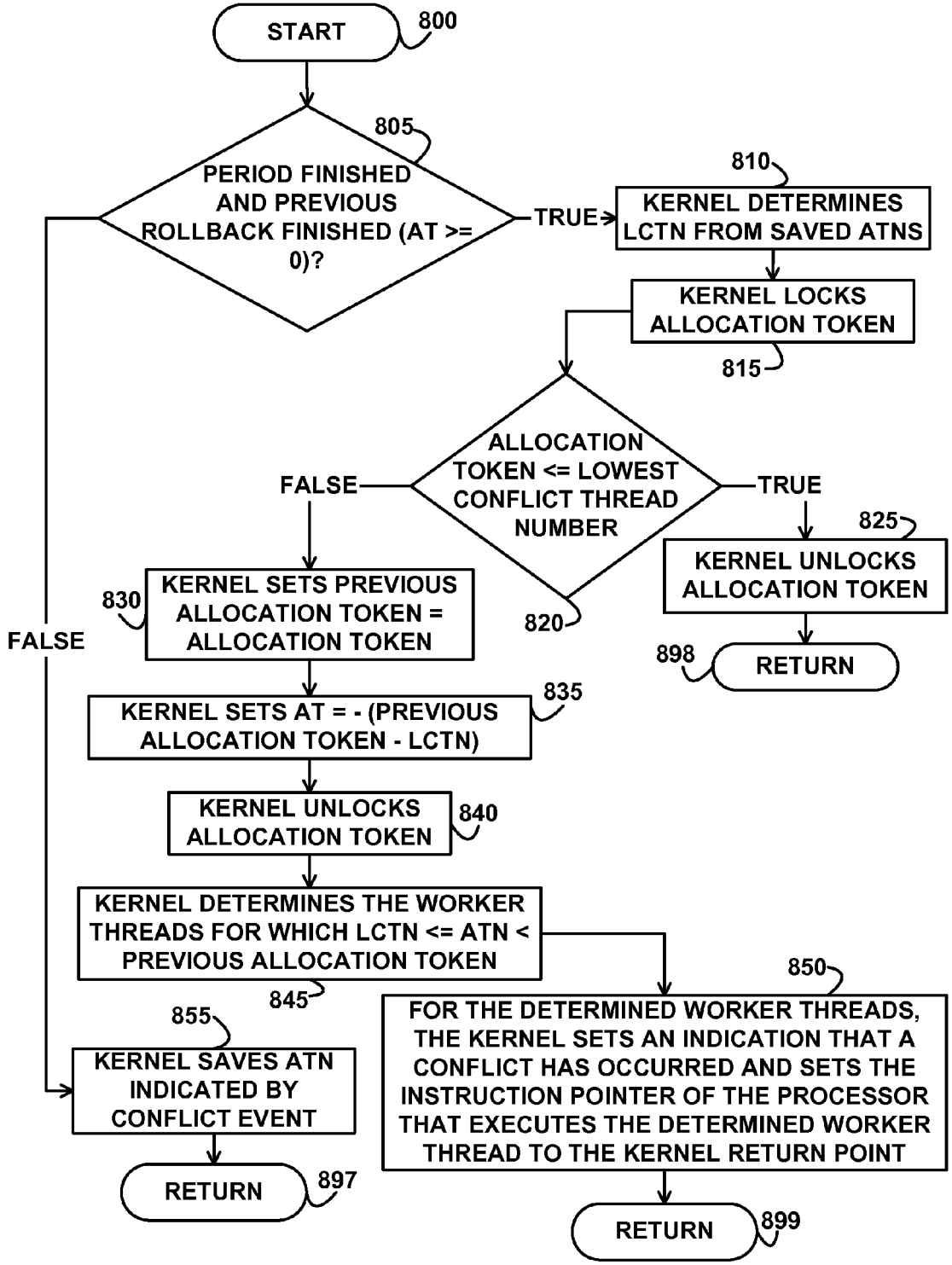
FIG. 8 depicts a flowchart of example processing for a kernel, according to an embodiment of the invention.

FIG. 8 depicts a flowchart of example processing for the kernel, according to an embodiment of the invention. The logic of the kernel 144 illustrated in FIG. 8 may be invoked either periodically in response to a time interrupt that indicates the expiration of a rollback time period or in response to receiving a conflict event. Conflict events may be sent by both the cache controller 130, in response to detecting a conflict between a younger worker thread and an older worker thread, and by the epilogue code of the worker threads, as previously described with reference to FIG. 7.

As used herein, the current rollback time period is the rollback time period during which the current invocation of the kernel 144 executes, the previous rollback time period is the rollback time period during which a previous invocation of the kernel 144 executed, and the previous invocation of the kernel 144 initiated a previous round of rollback operations during the previous rollback time period. The previous rollback time period is earlier in time than the current rollback time period. The current invocation of the kernel 144 is also referred to herein as the kernel 144.

Control begins at block 800. Control then continues to block 805 where the kernel 144 determines whether the time of the previous rollback time period has elapsed or expired and any previous round of rollback operations has finished. In an embodiment, the kernel 144 determines whether any previous round of rollback operations has finished by determining whether the AT 202 is greater than or equal to zero.

If the determination at block 805 is true, then the previous rollback time period has elapsed and any previous round of rollback operations have finished, so control continues to block 810 where the kernel 144 determines the lowest conflict thread number (LCTN); i.e., the kernel 144 determines the lowest absolute thread number (ATN) among threads that encountered conflicts and caused conflict events that the previous invocation of the kernel 144 received during the previous rollback time period. Stated another way, the kernel 144 determines the oldest work unit among all those work units 150 whose execution in a thread encountered a conflict and generated a conflict event during the previous rollback time period. The kernel 144 determines the LCTN by comparing the ATNs that the kernel saved during the previous rollback time period, as further described below with reference to block 855.

Control then continues to block 815 where the kernel 144 locks the AT 202. Locking the AT 202 means that the current invocation of the kernel 144 has exclusive access to the AT 202, and other invocations of the kernel 144 and worker threads are prevented from obtaining a lock and prevented from reading/writing data values from/to the AT 202. If the kernel 144 cannot obtain a lock on the AT 202 because the AT 202 is locked by another invocation of the kernel 144 or by a worker thread, then the kernel 144 waits at block 810 for the AT 202 to become unlocked, so that the current invocation of the kernel 144 can lock the AT 202.

Control then continues to block 820 where the kernel 144 determines whether the AT 202 identifies a work unit that is older than the oldest work unit whose execution in a thread encountered a conflict and generated a conflict event during the previous rollback time period or whether the AT 202 identifies the oldest work unit whose execution in a thread encountered a conflict and generated a conflict event during the previous rollback time period. In an embodiment, the kernel 144 makes the determination of block 820 by determining whether the AT 202 is less than or equal to the lowest conflict thread number (LCTN) 206.

If the determination at block 820 is true, then the AT 202 identifies a work unit that is older than the oldest work unit whose execution in a thread encountered a conflict and generated a conflict event during the previous rollback time period or the AT 202 identifies the oldest work unit whose execution in a thread encountered a conflict and generated a conflict event during the previous rollback time period, so the threads that would need to be rolled back have not yet started executing, so no threads exist that need to be rolled back, so control continues to block 825 where the kernel 144 unlocks the AT 202. Control then continues to block 898 where the logic of FIG. 8 returns.

If the determination at block 820 is false, then the AT 202 identifies a work unit that is younger than the oldest work unit whose execution in a thread encountered a conflict and generated a conflict event during the previous rollback time period, so the threads that need to be rolled back are executing, so control continues to block 830 where the kernel 144 sets the previous allocation token to be the value in the AT 202.

Control then continues to block 835 where the kernel 144 determines the number (quantity) of worker threads that need to be rolled back as the number (quantity) of worker threads that are the same age or younger than the LCTN thread (the thread identified by the LCTN 206) and older than the AT thread (the thread identified by the AT 202) and sets the AT 202 to be the negative of this number. (Being older than the AT thread means that the work unit has been assigned to a worker thread that is executing on a processor.) In an embodiment, the kernel 144 performs the processing of block 835 by setting the AT 202 to be the negative of (the previous AT minus the LCTN 206). Control then continues to block 840 where the kernel 144 unlocks the AT 202.

Control then continues to block 845 where the kernel 144 determines the ATNs of the worker threads that are younger than or the same age as the LCTN thread and older than the previous AT thread. In an embodiment, the kernel 144 performs the processing of block 845 by determining the ATNs of the worker threads that satisfy the condition: LCTN 206 is less than or equal to the ATN and the ATN is less than or equal to the previous allocation token.

Control then continues to block 850 where, for the worker threads determined in block 845, the kernel 144 sets an indication that the determined worker thread has encountered a conflict and sets the instruction pointer of the processors that execute the determined threads to be the kernel return point, which is illustrated in FIG. 5 as block 501. In an embodiment, the indication that a worker thread has encountered a conflict is implemented as a value in a register of the processor on which the worker thread executes. Setting the instruction pointer of the processors that execute the determined threads to be the kernel return point causes the determined threads to jump from whatever instruction they are currently executing (no matter where that current instruction is located within the logic of FIG. 5, 6, 7, or 9) to block 501 followed by block 520 of FIG. 5 in FIG. 5.

Thus, the kernel 144 initiates a round of rollback operations in the current rollback time period. Control then continues to block 899 where the logic of FIG. 8 returns.

If the determination at block 805 is false, then the rollback time period has not elapsed or any previous round of rollback operations has not finished, so control continues to block 855 where the kernel 144 saves the ATN of the thread indicated by the received conflict event. Control then continues to block 897 where the logic of FIG. 8 returns, and the worker thread that encountered the conflict that caused the chip 101 to send the conflict event continues executing from the instruction that encountered the conflict or the worker thread that sent the conflict event waits, as previously described above with reference to FIG. 7. Thus, the kernel 144 does not automatically initiate rollbacks in response to conflict events, but waits to initiate rollbacks until the previous rollback time period has expired.

Thus, the kernel 144 collects conflict events during each rollback period. At the expiration of a rollback period, if the kernel 144 has received at least one conflict event, the kernel 144 starts a round of rollback operations. A round of rollback operations invalidates worker threads, rolls back the actions performed by the work units 150 of the worker threads, and restarts those worker threads. The worker threads perform their own invalidation and restarting in a distributed fashion. In other words, the kernel 144 is not involved once a rollback round starts at block 850 of FIG. 8. Instead, the kernel 144 sets a value (whose absolute value indicates the number of threads to be rolled back) into the AT 202, then indicates to the worker threads that are younger or the same age as the LCTN 206 that they should be rolled back. Each worker thread then invalidates itself and increments AT 202 (via invoking its instances of the conflict handler 146, which executes within the respective worker thread), until the last worker thread has finished invalidation.

Since each worker thread performs thread invalidation, multiple invalidations cannot be executed at the same time. Hence, the kernel 144 first ensures that the previous round of invalidation has finished, which is indicated by a positive value in AT 202. Before initiating rollbacks, the kernel 144 checks if AT<=LCTN at block 820 of FIG. 8. If this is true, the threads that should be rolled back have not started executing yet, and there is no reason to roll back a thread whose execution has not started, so the kernel 144 returns at block 898 of FIG. 8 without initiating rollbacks. Otherwise, the number of threads that need to be rolled back is AT-LCTN, and the kernel 144 sets the negative of this value into the allocation token (AT) 202 at block 835. Finally, the kernel 144 sets the threads with an ATN between LCTN 206 and the previous AT value to execute at their respective kernel return point.

Figure 9:
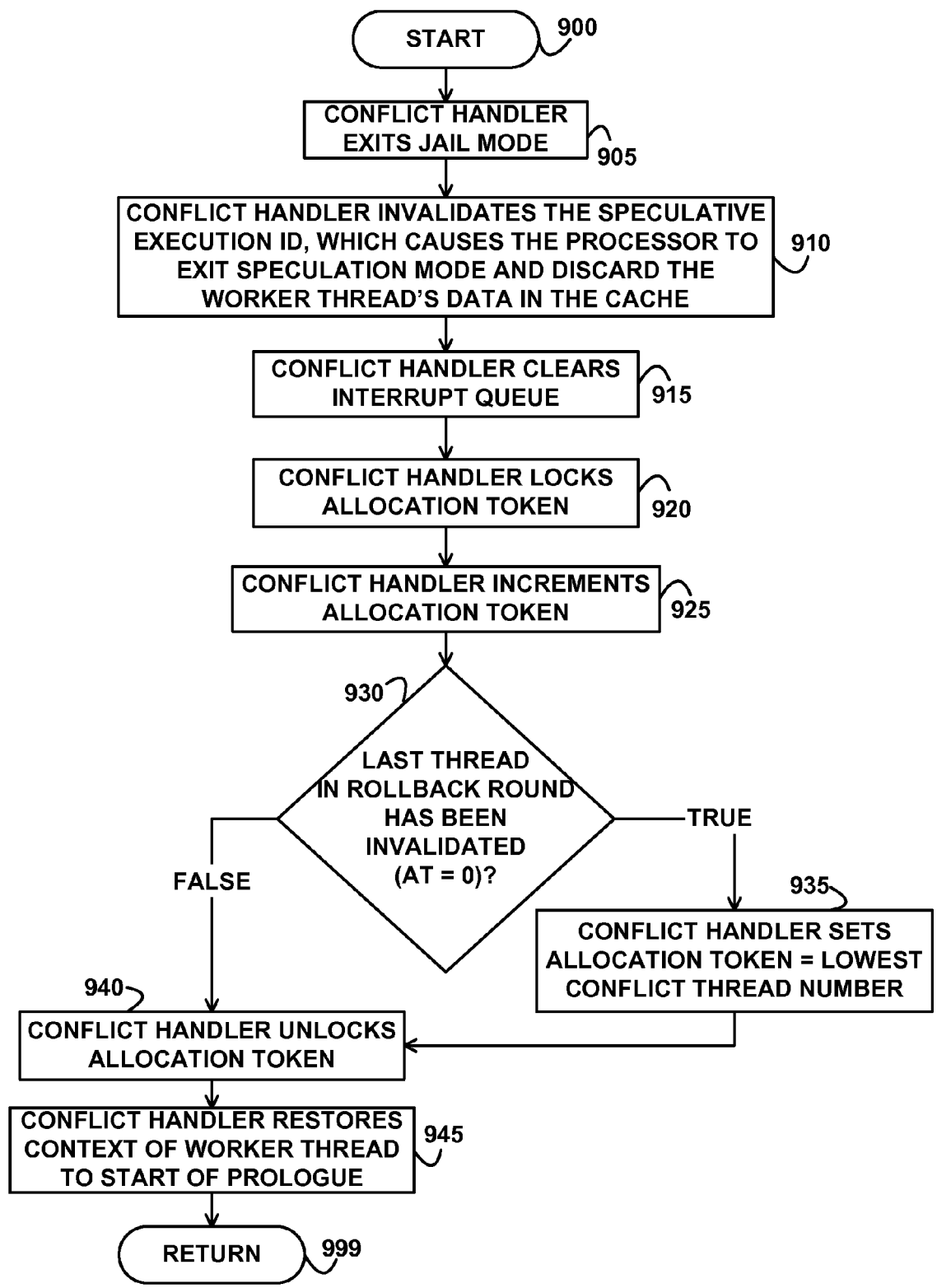
FIG. 9 depicts a flowchart of example processing for a conflict handler, according to an embodiment of the invention.

FIG. 9 depicts a flowchart of example processing for the conflict handler in a thread, according to an embodiment of the invention. The logic of FIG. 9 is reentrant and a different invocation instance of the logic of FIG. 9 executes in each of the worker threads. The term "current conflict handler," as used herein, refers to the invocation instance of the handler in the worker thread that is currently being described.

Control begins at block 900. Control then continues to block 905 where the current conflict handler 146 exits jail mode. Exiting jail mode causes the kernel 144 to no longer monitor the current worker thread for system calls and memory accesses that, if completed, would cause irrevocable actions.

Control then continues to block 910 where the current conflict handler 146 invalidates the speculative execution identifier of the current worker thread, which causes the processor to exit speculation mode for the current worker thread. Exiting speculation mode means that the cache controller 130 stops associating memory accesses with the speculative execution identifier, and the cache controller 130 discards the data that the execution of the current work unit stored in the cache 125 and does not copy the data to the memory 102. Control then continues to block 915 where the current conflict handler 146 clears or erases interrupts from the interrupt queue.

Control then continues to block 920 where the current conflict handler 146 locks the AT 202. Locking the AT 202 means that the current worker thread has exclusive access to the AT 202 and other threads are prevented from obtaining a lock or from reading/writing data values from/to the AT 202. If the current conflict handler 146 cannot obtain a lock on the AT 202 because the AT 202 is locked by another worker thread, then the current conflict handler 146 waits at block 920 for the other worker thread to unlock the AT 202, so that the current conflict handler 146 can lock the AT 202.

After the lock has been obtained on the AT 202, then control continues to block 925 where the current conflict handler 146 decreases the number of threads that need to be rolled back by one. In an embodiment, the current conflict handler 146 performs the processing of block 925 by incrementing the AT 202. Prior to the incrementing, the AT 202 was a negative number.

Control then continues to block 930 where the current conflict handler 146 determines whether the invalidation of the current thread that was performing by the current conflict handler 146 is the last invalidation in the round of rollbacks. In an embodiment, the current conflict handler 146 makes the determination of block 930 by checking whether the AT 202 is equal to zero.

If the determination at block 930 is true, then the invalidations of threads in the rollback round are complete, so control continues to block 935 where the current conflict handler 146 sets the AT 202 to be the lowest conflict thread number (LCTN) 206, which allows the rolled back threads to begin execution starting at the oldest thread that should be restarted in the current rollback time period, as previously described above with reference to FIG. 6.

Referring again to FIG. 9, control then continues to block 940 where the current conflict handler 146 unlocks the AT 202. Control then continues to block 945 where the current conflict handler 146 restores the context of the current thread to the start of prologue code in the current thread, meaning that the current conflict handler 146 sets the instruction pointer, which indicates the next instruction to execute, for the processor that executes the current thread to point to the beginning of the logic of block 530 of FIG. 5. Control then continues to block 999 where the logic of FIG. 9 returns to block 530 of FIG. 5.

Referring again to FIG. 9, if the determination at block 930 is false, then the invalidations of threads in the rollback round are not complete, so control continues to block 940 where the current conflict handler 146 unlocks the AT 202, without setting the AT 202 to be the lowest conflict thread number (LCTN) 206. Control then continues to block 945, as previously described above.

Figure 10:
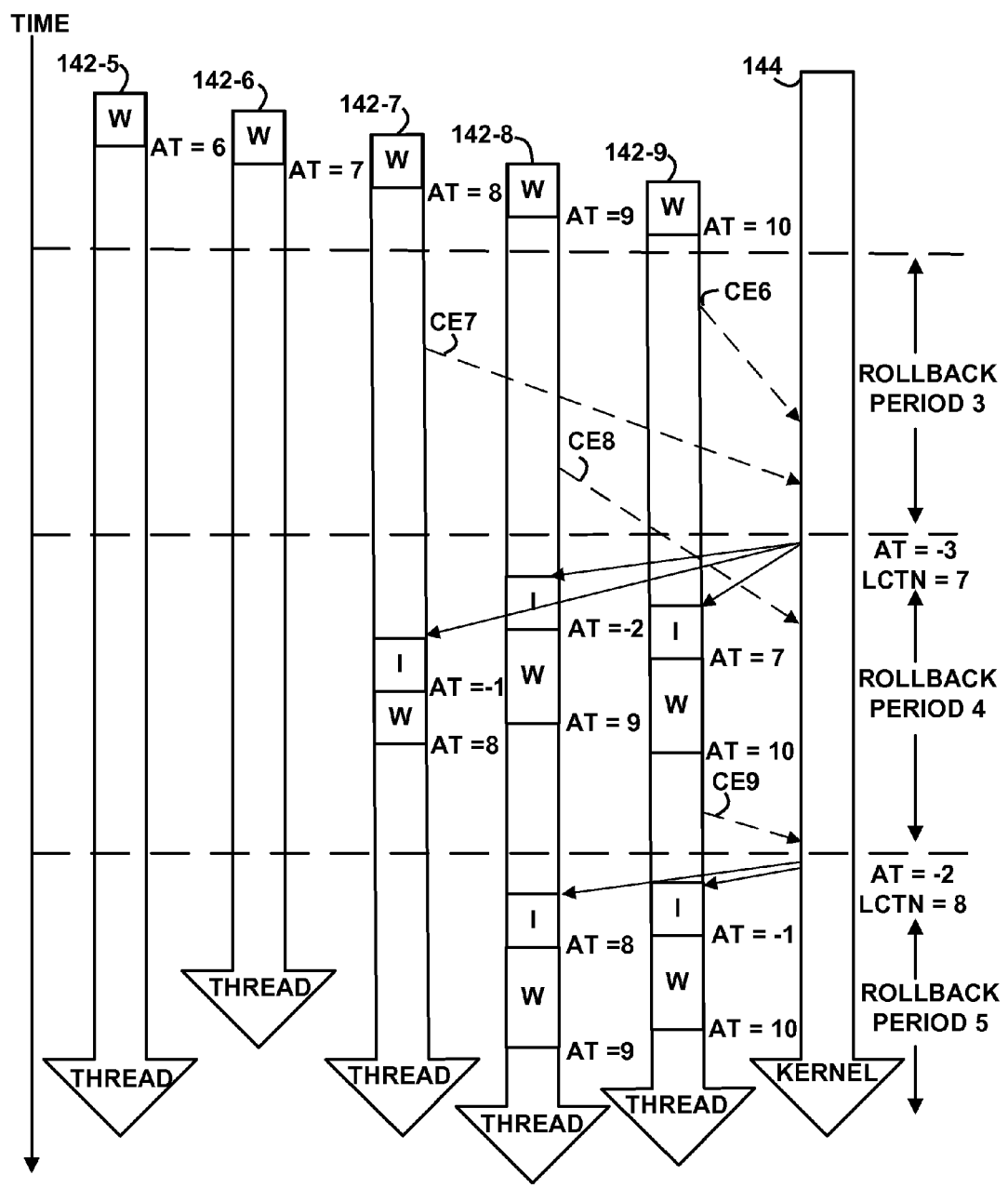
FIG. 10 depicts a graph of example thread execution of threads over time with resulting conflict events sent to a kernel across rollback periods, according to an embodiment of the invention.

FIG. 10 depicts a graph of example thread execution of worker threads over time with resulting conflict events sent to the kernel 144 across rollback periods, according to an embodiment of the invention. The example graph of FIG. 10, with time on the vertical axis starting at an earlier time at the top of the graph and moving to later times toward the bottom of the graph, illustrates the execution over time of the worker threads 142-5, 142-6, 142-7, 142-8, and 142-9 and the kernel 144. The worker threads 142-5, 142-6, 142-7, 142-8, and 142-9 are examples of the threads 142 (FIG. 1).

For ease of illustration, the worker threads 142-5, 142-6, 142-7, 142-8, and 142-9 are ordered on the graph from left-to-right starting with the oldest worker thread 142-5 and ending with the youngest worker thread 142-8 (the thread 142-8 received the youngest work unit, meaning the work unit that was received at the latest time, or that would be executed last in a sequential execution of the application 140, as compared to the oldest work unit 142-5).

The graph of FIG. 10 illustrates a third rollback time period, a fourth rollback time period, and a fifth rollback time period. The graph of FIG. 10 further illustrates that the execution of the worker threads 142-7, 142-8, and 142-9 causes the chip 101 to send the conflict events CE7, CE8, and CE6, respectively, during the third rollback period, and the kernel 144 receives the conflict events CE6 and CE7 during the third rollback period and receives the conflict event CE8 during the fourth rollback period. The execution of the worker thread 142-9 further causes the chip 101 to send the conflict event CE9 during the fourth rollback period, and the kernel 144 receives the conflict event CE9 during the fourth rollback period.

The notation of "W" within the threads indicates the time spent while a thread is waiting in the while loop inside the prologue code (FIG. 6) for the AT 202 to become equal to the absolute thread number. Referring again to FIG. 10, the notation of "I" within the threads indicates the time spent while a thread is being invalidated due to conflicts (FIG. 9).

Referring again to FIG. 10, the main thread initializes AT 202 to 5, which is the oldest ATN that the main thread will assign, and each worker thread receives a work unit, with ATN equal to the thread number of the worker thread, e.g., the worker thread 142-5 receives a work unit with ATN=5, the worker thread 142-6 receives a work unit with ATN=6, the worker thread 142-7 receives a work unit with ATN=7, the worker thread 142-8 receives a work unit with ATN=8, and the worker thread 142-9 receives a work unit with ATN=9. In the prologue of the worker thread 142-5, AT 202 is set to 6 indicating that the thread 142-6 can now start. Similarly, in the prologue of the worker thread 142-5, AT 202 is set to 7, etc. In this manner, the worker threads 142-5, 142-6, 142-7, 142-8, and 142-9 are started in-order, which guarantees that the chip 101 assigns speculative execution identifiers to the worker threads in order of their ages. During the third rollback time period, three conflict events occur (CE6, CE7, and CE8) and are sent from the worker threads 142-9, 142-7, and 142-8, respectively, but due to delays, only CE7 and CE8 are received by the kernel 144 during the third rollback time period. Thus, at the end of the third rollback time period, the kernel 144 determines that LCTN 206 is 7, because the worker thread 142-7 is the oldest worker thread that needs to be rolled back. Thus, the kernel 144 instructs the threads 142-7, 142-8, and 142-9 to rollback their respective work units 150. Note that the kernel 144 instructs the thread 142-8 to roll back its work unit (despite the fact that a conflict event was not received for the thread 142-8 during the previous rollback period) because the work unit of the thread 142-8 is younger than the thread 142-7 identified by the LCTN 206, as previously described above with reference to blocks 835, 845, and 850 of FIG. 8.

Referring again to FIG. 10, the kernel 144 further sets AT 202 to −3, informing the worker threads that three threads need to be invalidated. The conflict handlers 146 within the worker threads perform their invalidation in a distributed manner. The order of invalidation is arbitrary and is dependent on such factors as the speed of the processors, the length of the wires from the memory 102 to the respective cores 115, and which thread has its needed code already in the processor cache versus stored in the memory 102 or swapped out to the disk device 150. In the example of FIG. 10, the thread 142-8 finishes invalidation first, sets AT 202 to −2, and enters its prologue waiting for its turn to start executing its work unit. Next, the thread 142-7 finishes invalidation and sets AT 202 to −1. When the last thread 142-9 finishes invalidation, it sets AT 202 to 7, which is the value of the LCTN 206 passed from the kernel 144. In response, the thread 142-7 realizes that AT 202 now equals to its ATN. Thus, the thread 142-7 finishes its prologue and sets AT 202 to 8, which allows the thread 142-8 to start executing its work unit. The worker thread 142-8 sets AT 202 to 9, which allows the worker thread 142-9 to start executing its work unit. The worker thread 142-9 sets AT 202 to 10. Thus, once all three worker threads have restarted executing their respective work units 150 within the fourth rollback time period, AT 202 is 10.

During the fourth rollback time period, the kernel 144 receives two conflict events (CE8 from the thread 142-8 and CE9 from the thread 142-9), so the kernel 144 sets the LCTN 206 to 8 at the beginning of the fifth rollback time period since of the two threads that caused conflict events, the thread 142-8 is the oldest. The kernel 144 also sets AT 202 to −2, indicating that two worker threads need invalidation.

In the example of FIG. 10, the thread 142-9 finishes invalidation first, sets AT 202 to −1, and enters its prologue waiting for its turn to start executing its work unit. Next, the thread 142-8 finishes invalidation and sets AT 202 to 8, which is the value of the LCTN 206 passed from the kernel 144. In response, the thread 142-8 determines that AT 202 now equals to its ATN. Thus, the thread 142-8 finishes its prologue and sets AT 202 to 9, which allows the thread 142-9 to start executing its work unit. The worker thread 142-9 sets AT 202 to 10. Thus, after the worker threads 142-8 and 142-9 have restarted executing their respective work units 150 within the fifth rollback time period, AT 202 is 10.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   receiving a plurality of asynchronous conflict events during a previous rollback period, wherein the plurality of asynchronous conflict events represent conflicts encountered by speculative execution of a first plurality of work units;
   determining, during a current rollback period, a first work unit whose speculative execution raised one of the plurality of asynchronous conflict events, wherein the first work unit is one of the first plurality of work units, and wherein the first work unit is older than all other of the first plurality of work units;
   determining a second plurality of work units whose ages are equal to or older than the first work unit, wherein each of the second plurality of work units are assigned to respective speculatively executing threads;
   initiating, during the current rollback period, rollbacks of the second plurality of work units whose ages are equal to or older than the first work unit that is older than all of the other of the first plurality of work units that encountered conflicts represented by the plurality of asynchronous conflict events during the previous rollback period, wherein the rollbacks are performed by the respective speculatively executing threads; and
   wherein the previous rollback period is the rollback period during which a previous invocation of a kernel is executed, and the previous invocation of the kernel initiates a previous round of rollback operations during the previous rollback period.

2. The method of claim 1, wherein the receiving the plurality of asynchronous conflict events further comprises:
   receiving the plurality of asynchronous conflict events out-of-order from an order in which the speculative execution of the first plurality of work units encountered the conflicts.

3. The method of claim 1, further comprising:
   after the rollbacks of the second plurality of work units are complete, initiating speculative execution of the second plurality of work units, wherein the initiating is performed in age order of the second plurality of work units, from oldest to youngest.

4. The method of claim 1, wherein one of the plurality of asynchronous conflict events represents a conflict between the first work unit and a second work unit, wherein the first work unit is younger than the second work unit, and wherein the second work unit is not one of the first plurality of work units.

5. The method of claim 1, wherein speculative execution of one of the second plurality of work units did not encounter any of the conflicts represented by the plurality of asynchronous conflict events.

6. The method of claim 1, further comprising:
   changing a duration of the previous rollback period.

7. The method of claim 1, further comprising
   committing the first plurality of the work units and the second plurality of the work units in age order from oldest to youngest, wherein the age order comprises an order of the first plurality of the work units and the second plurality of the work units in a sequential program.

* * * * *